United States Patent
Matsue et al.

(10) Patent No.: US 8,284,095 B2
(45) Date of Patent: Oct. 9, 2012

(54) RADAR DETECTION DEVICE USED IN WIRELESS COMMUNICATION DEVICE

(75) Inventors: Kiyotaka Matsue, Fuchu (JP); Takashi Ueno, Kawasaki (JP); Koji Horisaki, Yokohama (JP); Toshiyuki Yamagishi, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 371 days.

(21) Appl. No.: 12/756,524

(22) Filed: Apr. 8, 2010

(65) Prior Publication Data

US 2011/0068968 A1   Mar. 24, 2011

(30) Foreign Application Priority Data

Sep. 18, 2009   (JP) ................. 2009-217935

(51) Int. Cl.
  *G01S 7/42*  (2006.01)
(52) U.S. Cl. ........................................................ 342/20
(58) Field of Classification Search .................... 342/20, 342/27
  See application file for complete search history.

(56) References Cited

U.S. PATENT DOCUMENTS

| | | |
|---|---|---|
| 6,697,013 B2 | 2/2004 | McFarland et al. |
| 2009/0061780 A1 | 3/2009 | Sekiya et al. |
| 2010/0020711 A1 | 1/2010 | Horisaki et al. |
| 2010/0171592 A1* | 7/2010 | Kamemaru ............. 340/10.1 |
| 2011/0009071 A1* | 1/2011 | Stager et al. ............ 455/67.16 |

FOREIGN PATENT DOCUMENTS

| | | |
|---|---|---|
| JP | 06-037762 | 2/1994 |
| JP | 2006-086665 | 3/2006 |
| JP | 2007-049694 | 2/2007 |
| JP | 2007-171164 | 7/2007 |
| JP | 2007-274659 | 10/2007 |

OTHER PUBLICATIONS

Japanese Office Action for Japanese Application No. 2009-217935 mailed on Jan. 24, 2012.

* cited by examiner

*Primary Examiner* — Timothy A Brainard
(74) *Attorney, Agent, or Firm* — Turocy & Watson, LLP

(57) ABSTRACT

A radar detection device of an example of the present invention includes a section which increments a value of a counter when a first difference value between a receiving power value in detecting an edge of a received signal of wireless communication and a receiving power value after a first time elapses since the edge detection is more than a first threshold, and a section which determines whether a second difference value between the value of the counter and a value of the counter before a third time is not lower than a second threshold in each of passage of a second time, and determines that radar is detected when the second difference value is not lower than the second threshold.

13 Claims, 8 Drawing Sheets

| Classification(process) | Name | Value |
|---|---|---|
| Data obtaining section 22 | Time interval at which data is obtained from HW : T4<br>Period at which data used from (C1) to (C3) is obtained : T4 | 750[ms]<br>750[ms] |
| Data producing section 23 | Time interval at which new data is produced from obtained data : T4 | 12[s] |
| Data producing section 23 | Time interval at which comparison target data is obtained in comparing of (C1) : T5 | 1 |
| Data producing section 23 | Threshold of difference in comparing of (C1) : V3 | 8 |
| Data producing section 23 | Threshold of (C2) : V4 | 65 |
| Data producing section 23 | Threshold of (C3) : V5 | 750[ms] |
| Detection section 24 | Time interval at which radar detection determination is executed : T6 | 3[s] |
| Detection section 24 | Time interval at which comparison target data is obtained in determining radar detection counter : T7 | 5 |
| Detection section 24 | Threshold of difference in comparing radar detection counter : V6 | 12[s] |
| Detection section 24 | Time interval at which comparison target data is obtained in comparing of (C1) : T8 | 3 |
| Detection section 24 | Threshold of difference in comparing of (C1) : V7 | |

F I G. 6

(5.6 GHz band)
Chirp radar radio wave test signal

| Test signal | Pulse width (μs) | Chirp width (MHz) | Pulse repetition frequency (Hz) | Pulse period (μs) | The number of continuous pulses | The number of bursts |
|---|---|---|---|---|---|---|
| Chirp 1 | Width to which integer multiple of 1 μs is added in range of 50 μs to 100 μs | Width to which integer multiple of 1 MHz is added in range of 5 MHz to 20 MHz | 500 ~ 1,000 | Width to which integer multiple of 1 μs is added in range of 1000 μs to 2000 μs | Any integer of 1 to 3 | Any integer of 8 to 20 |

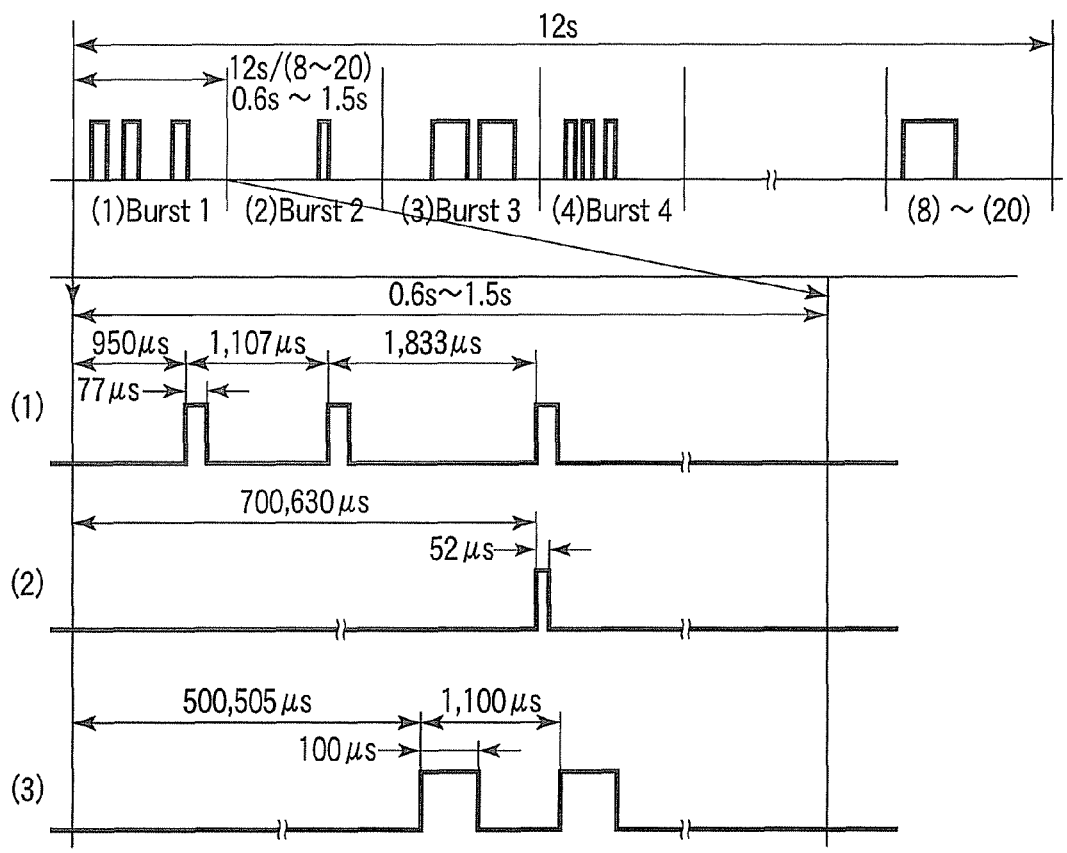

FIG. 7

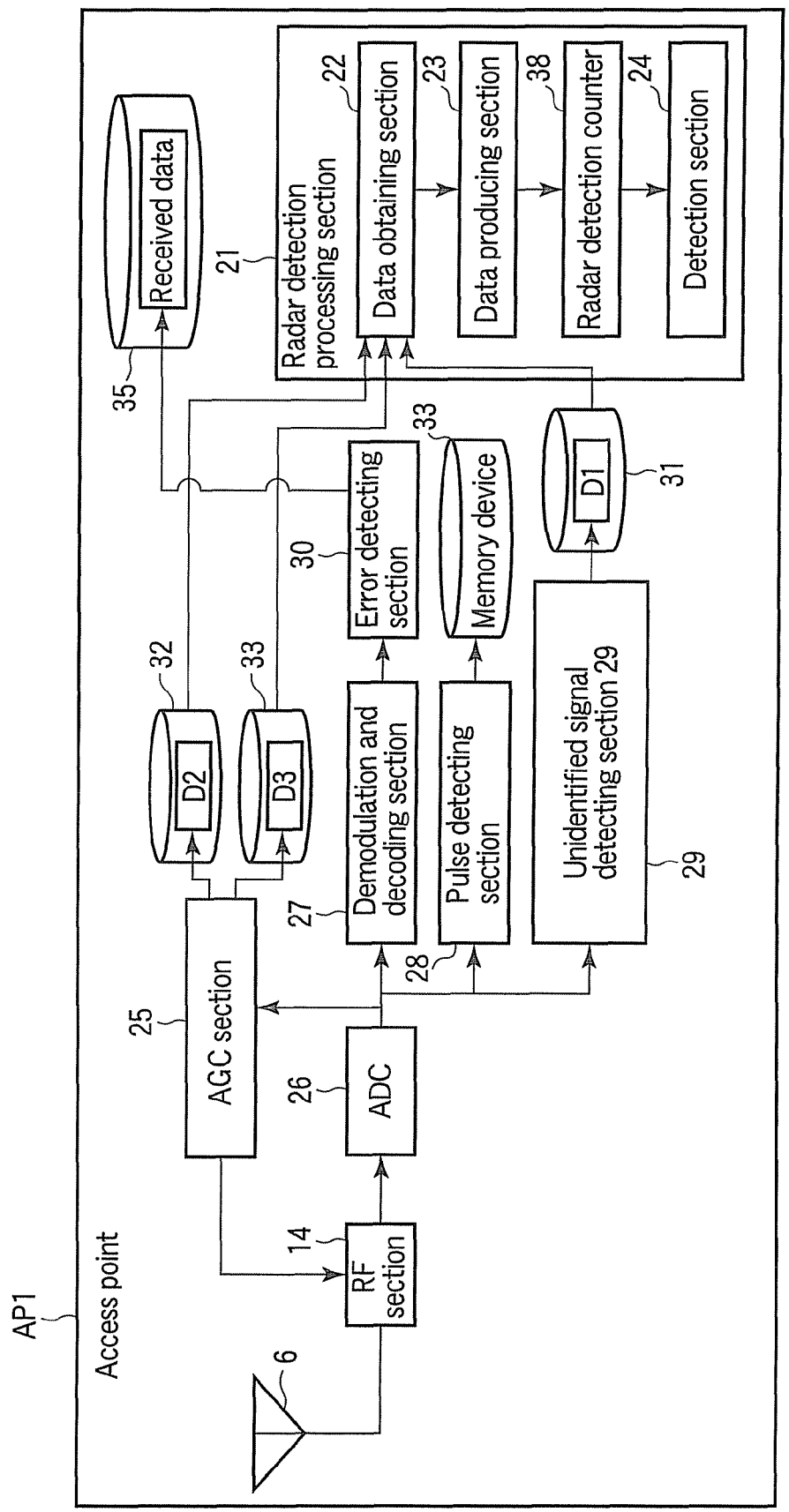
F I G. 8

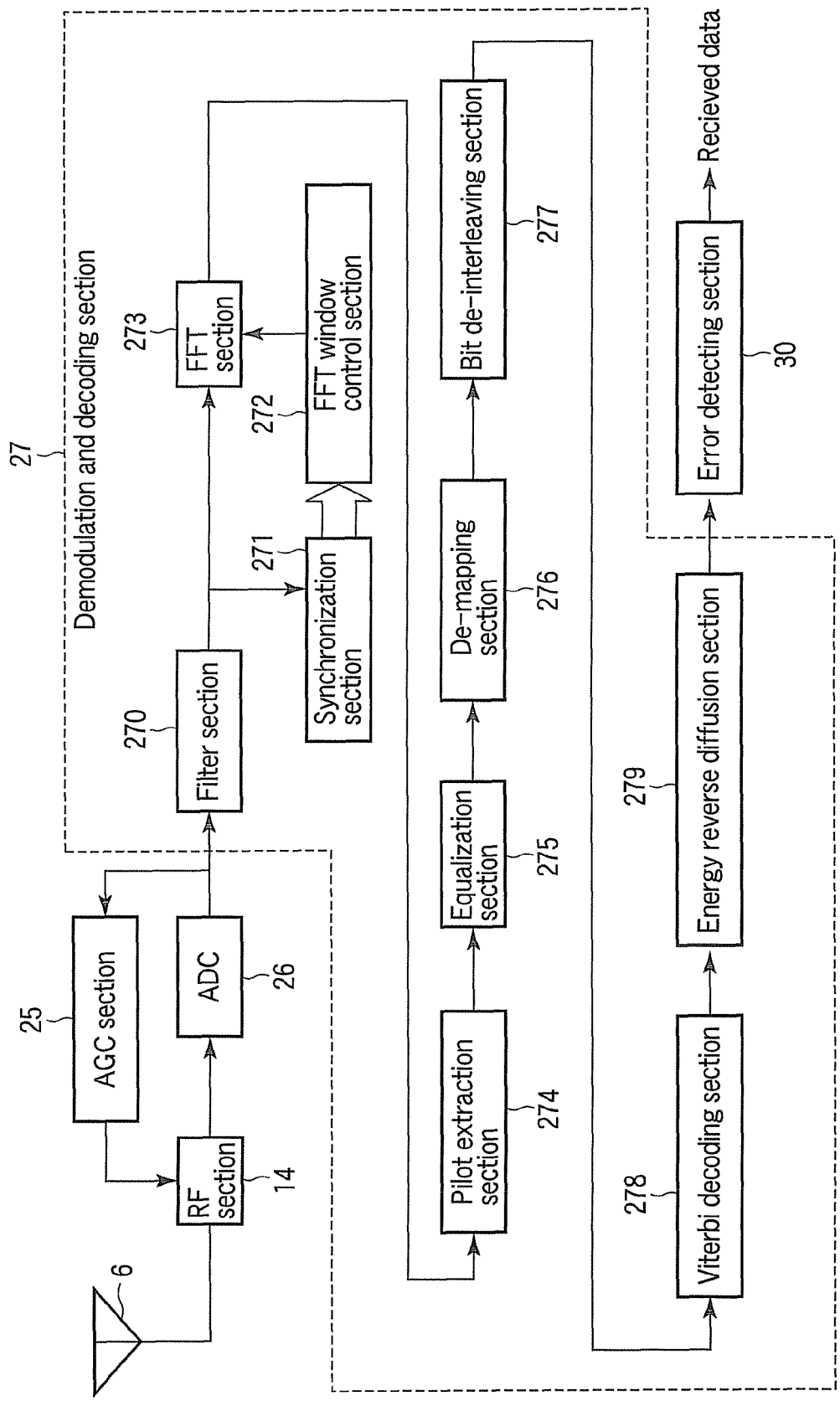
F I G. 9

RADAR DETECTION DEVICE USED IN WIRELESS COMMUNICATION DEVICE

CROSS-REFERENCE TO RELATED APPLICATIONS

This application is based upon and claims the benefit of priority from prior Japanese Patent Application No. 2009-217935, filed Sep. 18, 2009, the entire contents of which are incorporated herein by reference.

BACKGROUND OF THE INVENTION

1. Field of the Invention

The present invention relates to radar detection device for performing radar detection in wireless communication in conformity with a predetermined standard.

2. Description of the Related Art

For use of a communication device that executes wireless LAN communication in conformity with IEEE 802.11, it is necessary to comply with a radio law established in a country in which the communication device is used. The radio law includes many provisions for a wireless LAN signal, and also includes a provision for a radar detection function. The provision for the radar detection function is one provision that coordinates between the wireless LAN signal and a radar signal to conduct communication while the wireless LAN signal and the radar signal do not interfere with each other in an environment in which the wireless LAN signal and the radar signal are used in the same wireless frequency band.

The radar detection function is essential for the communication device that is commercially introduced and uses a band of W53/56. A manufacturer of the communication device mounts the radar detection function on the communication device using a unique method (algorithm).

For example, Jpn. Pat. Appln. KOKAI Publication Nos. 2007-274659, 2006-86665, and 2007-49694 disclose techniques concerning the radar detection function.

In a device of Jpn. Pat. Appln. KOKAI Publication No. 2007-274659, the number of times exceeding a threshold and the number of times lower than the threshold are counted to make a determination of pulse effectiveness with a receiving-field-intensity-signal-level threshold detecting circuit and an up-down counter, and a determination of effectiveness of a stable pulse is made with a circuit that counts a time width from the beginning to the end of the effective pulse. The device of Jpn. Pat. Appln. KOKAI Publication No. 2007-274659 compares a receiving IQ signal of a constant time interval from the beginning of the effective pulse to signal power that is obtained by passband limitation with a steep digital filter.

A device of Jpn. Pat. Appln. KOKAI Publication No. 2006-86665 comprises a power computing section that computes received signal power in the wireless communication, a radar detecting section that compares the received signal power computed by the power computing section to a previously set radar threshold to detect a radar signal, and a radar detection determining section that informs an upper layer of a communication protocol of the radar detection when the number of radar signal detection times performed by the radar detecting section exceeds a previously set predetermined value within a constant time.

A network device of Jpn. Pat. Appln. KOKAI Publication No. 2007-49694 selectively measures N time intervals between adjacent and nonadjacent control signals, and selectively determines that an RF signal is a radar signal when the N time intervals are substantially equal to one another.

Many wireless LAN devices that are commercially introduced as a general-purpose product detects a signal as the radar pulse signal even if the signal has radar pulse received signal intensity lower than that required by the radio law.

There is no problem with the radar detection with a margin from the standpoint of the compliance with the radio law. However, convenience of an end user is hampered.

For example, it is assumed that a provision that "it is necessary to stop the use of wireless LAN communication for 30 minutes in the channel in which the radar is detected" is included in the radio law.

In such cases, when a level at which the signal is determined to be the radar pulse signal is set lower, possibly the radar detection is frequently generated to lengthen the wireless LAN communication stopping interval.

Accordingly, although Jpn. Pat. Appln. KOKAI Publication Nos. 2007-274659, 2006-86665, and 2007-49694 disclose the radar detection techniques, there is a need to further enhance accuracy and prevent expansion of a circuit scale.

BRIEF SUMMARY OF THE INVENTION

In a first example of this invention, a radar detection device comprises: a count section which increments a count value of a counter when a difference value between a receiving power value in detecting an edge of a received signal of wireless communication and a receiving power value after a first time elapses since the edge detection is more than a first threshold; and a detection section which determines whether a difference value between the count value of the counter and a count value of the counter before a third time is not lower than a second threshold in each of passage of a second time, and determines that radar is detected when the difference value between the count value of the counter and the count value of the counter before the third time is not lower than the second threshold.

In a second example of this invention, a radar detection device comprises: a count section which increments a count value of a radar detection counter, based on a first value, a second value, and a third value, when a difference value between the latest first value and the first value before a first time is not lower than a first threshold while the second value and the third value are lower than a second threshold corresponding to the second value and a third threshold corresponding to the third value, the first value indicating the number of receiving times of a received signal that is neither in conformity with a predetermined standard nor an OFDM signal, the second value indicating a value of a digital RSSI signal when first-time automatic gain control is performed in a recent received frame, the third value indicating a value of RSSI in the latest received frame; and a detection section which determines whether a difference value between the latest value of the radar detection counter and a value of the radar detection counter before a third time is not lower than a fourth threshold in each of passage of a second time, and determines that radar is detected when the difference value is not lower than the fourth threshold.

In a third example of this invention, a radar detection device comprises: a count section which obtains the number of receiving times of a received signal that is neither in conformity with a predetermined standard nor an OFDM signal; and a detection section which determines whether a difference value between the latest number of receiving times and the number of receiving times before a predetermined time is not lower than a predetermined threshold, and determines that radar is detected when the difference value is not lower than the threshold.

BRIEF DESCRIPTION OF THE SEVERAL VIEWS OF THE DRAWING

FIG. 6 is a table illustrating an example of various parameters used in the radar detection processing section according to the second embodiment;

FIG. 7 is a view illustrating an example of a chirp radar radiowave test signal;

FIG. 8 is a block diagram illustrating an example of a communication device according to a third embodiment of the invention;

FIG. 9 is a block diagram illustrating an example of a configuration of a demodulation and decoding section according to the third embodiment.

DETAILED DESCRIPTION OF THE INVENTION

Embodiments of the invention will be described below with reference to the drawings. In the following drawings, an identical or similar component is designated by an identical numeral to omit or briefly make the overlapping description, and only the different portion is described in detail.

(First Embodiment)

A communication device according to a first embodiment of the invention conducts wireless LAN communication in conformity with at least one of the standards of IEEE 802.11 (including IEEE 802.11a). A communication device in conformity with other standards of IEEE 802.11 can obtain the similar effect by including a configuration similar to that of the communication device of the first embodiment.

The communication device of the first embodiment comprises the radar detection function to use W53/56 (wireless frequency band).

Figure 1:
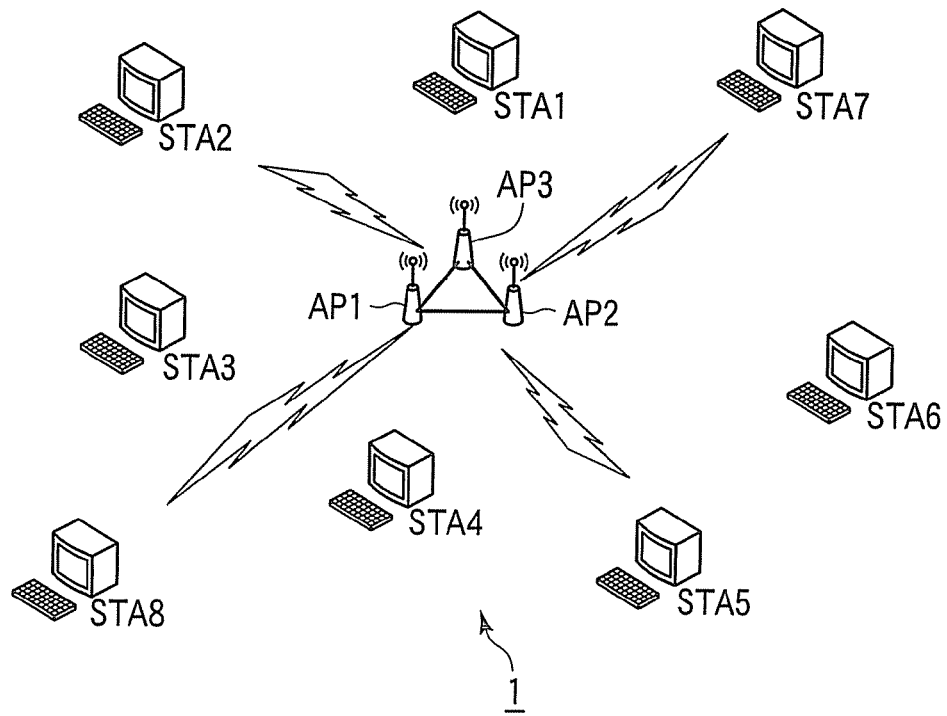
FIG. 1 is a conceptual diagram illustrating an example of a communication system according to a first embodiment of this invention.

FIG. 1 is a conceptual diagram illustrating an example of a communication system of the first embodiment.

A communication system 1 comprises pieces of parent-station communication device (access point) AP1 to AP3 and pieces of child-station communication device (station) STA1 to STA8. It is necessary to provide at least one access point and at least one station.

In FIG. 1, for example, the access point AP1 conducts communication with the stations STA1 to STA6, and the access point AP2 conducts communication with the stations STA7 and STA8.

The access point AP1 and the access point AP2 conduct wireless LAN communication using different wireless frequency channels, respectively.

Figure 2:
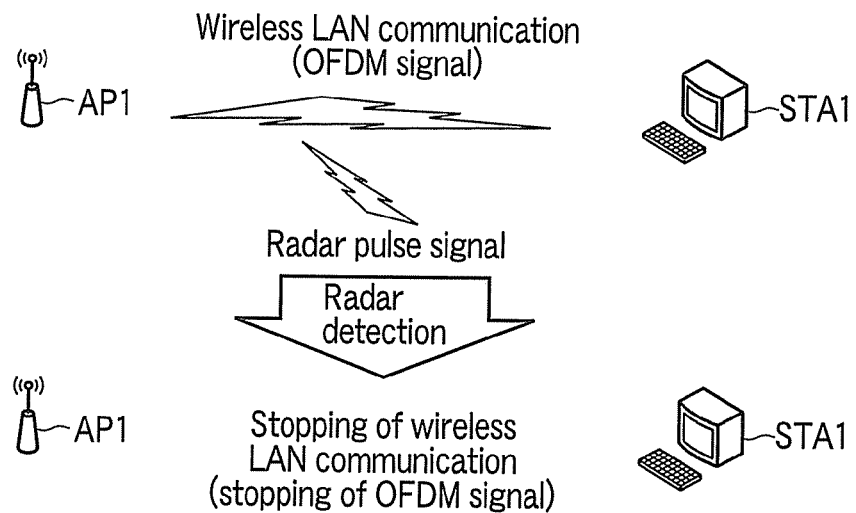
FIG. 2 is a conceptual diagram illustrating an example of the communication system in detecting a radar pulse signal.

FIG. 2 is a conceptual diagram illustrating an example of the communication system 1 in detecting a radar pulse signal.

In the first embodiment, the access points AP1 to AP3 comprise the radar detection functions.

Alternatively, the stations STA1 to STA8 may comprise the radar detection functions.

Although the communication between the access point AP1 and the station STA1 is described in FIG. 2, the same holds true for the communication between another access point and another station.

The access point AP1 conducts the wireless LAN communication with the station STA1. When the access point AP1 receives the radar pulse signal, the access point AP1 encourages the station STA1 to stop the wireless LAN communication. Both the access point AP1 and the station STA1 then stop the wireless LAN communication.

Figure 3:
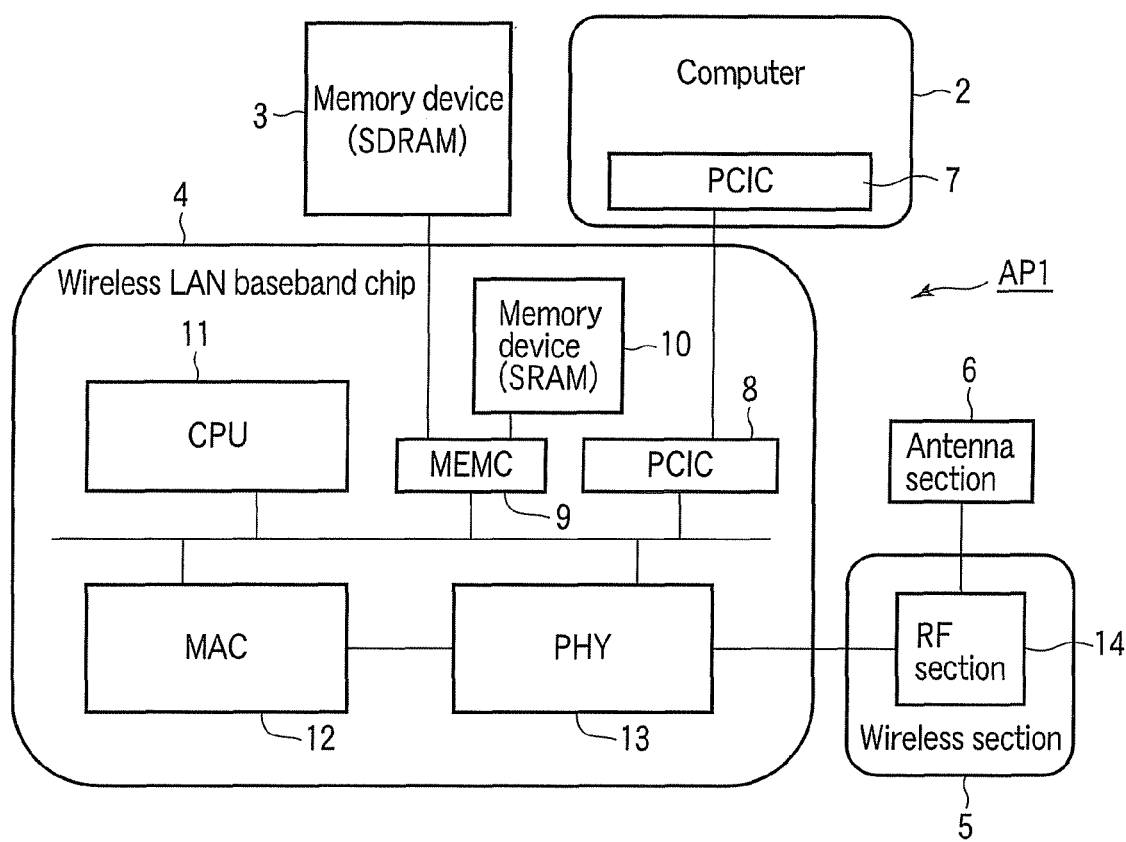
FIG. 3 is a block diagram illustrating an example of a hardware configuration of an access point AP1 according to the first embodiment.

FIG. 3 is a block diagram illustrating an example of a hardware configuration of the access point AP1 of the first embodiment. The access points AP2 and AP3 have configurations similar to that of the access point AP1. The stations STA1 to STA8 may have hardware configurations similar to that of the access point AP1 of FIG. 3.

The access point AP1 of the first embodiment comprises a computer 2, a memory device (storage device) 3 such as SDRAM, a wireless LAN baseband chip 4, a wireless section 5, and an antenna section 6.

When the access point AP1 is operated as a data transmitting side, the computer 2 of the access point AP1 transmits data from a PCIC (Peripheral Components Interconnect Controller) 7 on the side of the computer 2 to a memory device 10 such as SRAM or the memory device 3 via a PCIC 8 on the side of the wireless LAN baseband chip 4 and a MEMC (memory controller) 9, and the data is stored in the memory device 10 or the memory device 3. The access to memory devices 3 and 10 is obtained with the MEMC 9.

Then, CPU 11 gets access to data stored in the memory device 3 or memory device 10 through the MEMC 9, performs data transmission processing, and supplies the processed data to the wireless section 5 through an MAC (Medium Access Controller) 12 and a PHY (Physical layer) 13.

The processed data is transferred from an RF section 14 of the wireless section 5 to the antenna section 6, and then transmitted as a frame of the wireless LAN communication.

When the access point AP1 is operated as a data receiving side such that the access point AP1 receives the radar pulse signal, the access point AP1 performs the reverse of the operation on the data transmitting side.

The mounting of the radar detection function performed by the access point AP1 of the first embodiment is shared by software and hardware. The PHY 13 and the wireless section 5 comprising the RF section 14 can be cited as an example of the hardware used in the radar detection. The CPU 11, the MEMC 9, and the memory devices 3 and 10 can be cited as an example of the element necessary for the software processing of the radar detection.

When the main function of the radar detection function is realized by the hardware, for example, the main function of the radar detection function can be realized by the MAC 12. When the main function of the radar detection function is realized by the software, for example, the main function of the radar detection function can be realized by the CPU 11.

Figures 4, 5:
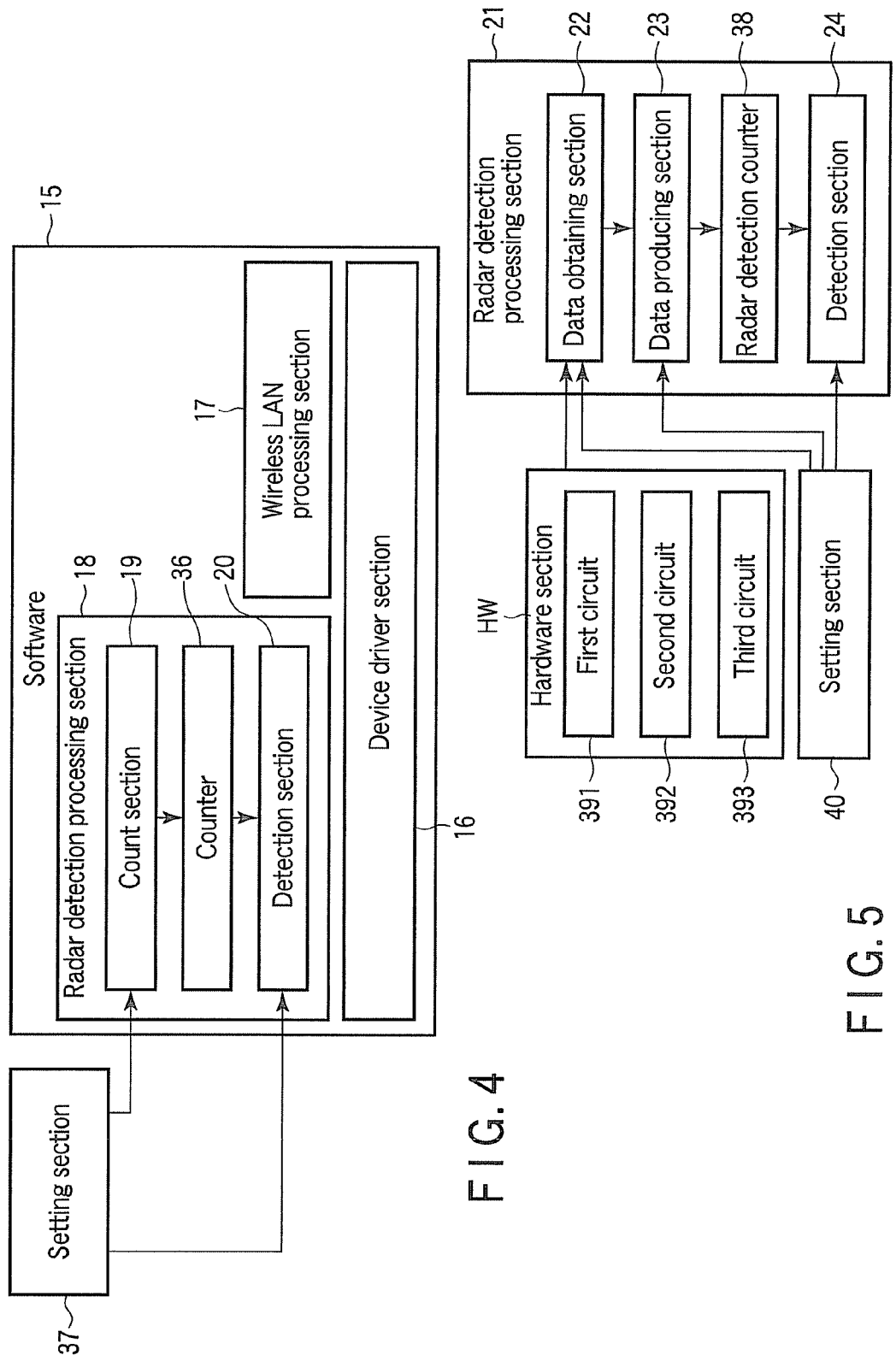
FIG. 4 is a block diagram illustrating an example of software for the access point AP1 according to the first embodiment.
FIG. 5 is a block diagram illustrating an example of a configuration of a radar detection processing section according to a second embodiment of the invention.

FIG. 4 is a block diagram illustrating an example of the software for the access point AP1 of the first embodiment.

Software 15 comprises a device driver section 16, a wireless LAN processing section 17, and a radar detection processing section 18.

The device driver section 16 performs various kinds of control to the hardware. For example, the device driver section 16 performs parameter setting and information collection from the hardware.

The wireless LAN processing section 17 performs various pieces of processing for the wireless LAN communication. For example, the wireless LAN processing section 17 performs production of a transmitting frame and analysis of a received frame.

The radar detection processing section 18 performs analysis for the radar detection based on the received signal, and performs processing after the radar detection.

The radar detection processing section 18 comprises a count section 19, a counter 36, and a detection section 20.

The count section 19 obtains a first difference value by comparing received signal intensity (first receiving power value) at the time of detecting an edge of the received signal and received signal intensity (second receiving power value) after a constant time T1 elapses since the time of the edge detection.

The count section 19 determines whether the first difference value is not lower than a first threshold V1. When the first difference value is not lower than the first threshold V1, a count value of the counter 36 is incremented. The counter 36 that counts the count value may be realized by the software with the CPU 11 and the memory devices 3 and 10, or may comprise the hardware counter.

The detection section 20 reads the count value every constant time T2, and obtains a second difference value by comparing a count value (for example, current count value) corresponding to a latest time and a count value (previous count value) corresponding to a time before a constant time T3 of the latest time.

The detection section 20 determines that the radar is detected when the second difference value is not lower than a second threshold V2. That is, the detection section 20 determines that the radar is detected when the count value increases to the second threshold V2 or more while the constant time T3 elapses.

The time interval T2 at which the count value is read can be set to, for example, a range of 650 ms to 850 ms, particularly to 750 ms.

The second threshold V2 can be set to, for example, a range of 3 to 7, particularly to 5.

In the first embodiment, the times T2 and T3 may be set to the identical value. In this case, the detection section 20 determines whether a difference value between the count values of the two continuous time intervals is not lower than the second threshold V2.

In the first embodiment, the radar pulse signal required by the radio law can accurately be detected when the radar pulse signal should be detected, and the detection of the radar pulse signal required by the radio law can be prevented when the radar pulse signal should not be detected. That is, in the first embodiment, only the radar pulse signal that is required to be detected can accurately be detected, and the radar pulse signal in conformity with the radio law can accurately be detected.

In the first embodiment, the radar detection function is mounted by converting the processing and configuration necessary for the wireless LAN communication, so that the expansion of the circuit scale can be prevented. That is, in the first embodiment, the amount of hardware necessary for the radar detection can be reduced to prevent the increase in circuit scale. Additionally, in the first embodiment, a hardware processing amount associated with the radar detection and the software processing amount associated with the radar detection can be reduced.

In the first embodiment, for example, unnecessary communication stopping caused by erroneous detection of the radar detection can be prevented by properly setting (optimizing) the parameters such as the constant time T1 and threshold V1 used in the count section 19 and the constant times T2 and T3 and threshold V2 used in the detection section 20, and only the radar pulse signal required to be detected can accurately be detected. The parameters of the count section 19 and detection section 20 can be set in theoretical, actual measurement, and empirical manners with a setting section 37.

(Second Embodiment)

A modification of the radar detection processing section 18 of the first embodiment will be described in a second embodiment. The description of other components than the radar detection processing section is omitted.

FIG. 5 is a block diagram illustrating an example of a configuration of a radar detection processing section according to the second embodiment of the invention.

FIG. 6 is a table illustrating an example of various parameters used in the radar detection processing section of the second embodiment.

A radar detection processing section 21 comprises a data obtaining section 22, a data producing section 23, a radar detection counter 38, and a detection section 24.

The data obtaining section 22 obtains various pieces of data measured by a hardware section HW of the communication device that conducts the wireless LAN communication.

In the second embodiment, the hardware section HW comprises a first circuit 391 that counts the number of times of the case in which a signal that is not the wireless LAN frame defined by IEEE 802.11a and is not the OFDM (Orthogonal Frequency Division Multiplexing) signal is received.

The hardware section HW comprises a second circuit 392 that measures digital RSSI (Receive Signal Strength Indication) when a first-time AGC (Automatic Gain Control) is performed in the latest received signal (finally received signal).

At this point, AGC is control in which output is kept constant irrespective of an input signal level. RSSI expresses intensity of the signal received by the wireless communication device.

The hardware section HW comprises a third circuit 393 that measures RSSI of the latest received signal.

The data obtaining section 22 obtains the measurement values of first to third circuits 391 to 393 of the hardware section HW. The data obtaining section 22 can obtain data necessary for the radar detection by obtaining the measurement values.

The data obtaining section 22 refers to data at constant intervals T4, and the data producing section (count section) 23 increments (increases the count value) the count value of the radar detection counter 38 when the following conditions C1 to C3 are satisfied.

The radar detection counter 38 may be realized by the software with the CPU 11 and the memory devices 3 and 10, or the counter of the hardware may be used as the radar detection counter 38.

The first circuit 391 measures the number of times of receiving the signal that is neither the wireless LAN frame defined by IEEE 802.11a nor the OFDM signal. The latest number of first circuit 391 and the number of first circuit 391 before a constant time T5 of the latest number are compared to each other. And the first condition C1 necessary to increment the count value of the radar detection counter 38 is satisfied when the difference value between the latest number of first circuit 391 and the number of first circuit 391 before a constant time T5 of the latest number is not lower than a threshold V3.

The second condition C2 necessary to increment the count value of the radar detection counter 38 is satisfied when the digital RSSI measurement value, which is measured by the second circuit 392 and obtained by the data obtaining section 22, is lower than a threshold V4 set for the digital RSSI measurement value.

The third condition C3 necessary to increment the count value of the radar detection counter 38 is satisfied when the RSSI measurement value of the latest received signal, which is measured by the third circuit 393 and obtained by the data obtaining section 22, is lower than a threshold V5 set for the RSSI measurement value of the latest received signal.

The detection section 24 determines the radar detection based on various pieces of data obtained by the data obtaining section 22 and the count value of the radar detection counter 38, which is produced by the data producing section 23.

For example, the detection section 24 determines the following two kinds of radar detection.

In the first radar detection determination, the detection section 24 reads the count value of the radar detection counter every constant time T6, compares the latest count value (current count value) and the count value before a constant time T7 of the latest count value, and determines that the radar is detected when a difference value between the latest count value and the count value before a constant time T7 of the latest count value is not lower than a threshold V6.

In the second radar detection determination, the detection section 24 reads the measurement value of the number of receiving times of the signal that is neither the wireless LAN frame defined by IEEE 802.11a nor the OFDM signal, compares the latest count value and the measurement value before a constant time T8 of the latest count value, and determines that the radar is detected when the difference value is not lower than a threshold V7.

For example, various parameters in the data obtaining section 22, data producing section 23, and detection section 24 of FIG. 6 can be set in theoretical, actual measurement, and empirical manners with a setting section 40 based on a technical conformance test (chirp radar radiowave test specifications) of FIG. 7.

As illustrated in FIG. 7, the radar used in the chirp radar radiowave test is determined by items such as "pulse width", "chirp width", "pulse repetition frequency", "pulse period", "the number of continuous pulses", and "the number of bursts".

In the chirp radar radiowave test, the high-accuracy radar detection function is required compared with other radar tests (such as fixed pulse radar test and variable pulse radar test).

The accuracy of radar detection is enhanced when the hardest radar signal to be detected by the radar detection function can be detected in the values of the items of FIG. 7.

In such cases, it is considered that the radar detection can be performed under the strictest condition (item value). It is difficult to accurately detect the "radar pattern having a small number of pulses". Therefore, in the second embodiment, that the "radar pulse pattern whose oversight is substantially impermissible can adequately be detected" is set as a goal. In the second embodiment, an algorithm focusing on the number of radar pulses is applied in order to deal with all the radar patterns. That is, in the second embodiment, the number of radar pulses is counted in a certain constant time, and the determination of the radar detection is made when the count value is not lower than a threshold.

Plural combinations of "the time for counting the number of pulses" and "the number of counts" are set, and the operation of the radar detection is performed using the plural "times for counting the number of pulses" and the plural "numbers of counts", all the radar pulse patterns defined by the radio law can adequately be detected.

In the example of FIG. 7, the radar transmission of 8 bursts to 12 bursts is performed in 12 s (seconds). At this point, the strictest condition is the case in which "the radar signal of 8 bursts is transmitted in 12 s while only one pulse exists in 1 burst". That is, the radar detection is accurately performed when the radar detection can accurately be performed to the radar pulse pattern in which only "8 pulses exist in 12 s".

In the second embodiment, the following two kinds of radar detection methods will be described.

In the first radar detection method, the determination of the radar detection is made when at least 5 pulses are detected in 12 s.

As described above, it is believed that the strictest condition is "8 pulses in 12 s". Therefore, it is easily thought that the direct detection of "8 pulses in 12 s" is acceptable. However, it is difficult in the actual test. In the actual technical conformance test, there is the need for the accuracy of radar detection at a duty ratio (ratio of a period during which the signal is transmitted from the wireless installation and a period during which the signal is not transmitted) of 17%. In consideration of the impossible performance of the radar detection in the period during which the wireless signal is transmitted, it is necessary that not "8 pulses in 12 s" but the radar signal in which only 6 pulses (=8×0.83) are transmitted be detected in principle for the strictest condition. Further, it is necessary to consider a possibility that the wireless signal cannot be detected for a certain period due to timing on the side of the device that performs the radar detection. Therefore, the radar detection condition that the determination of the radar detection is made when at least 5 pulses are detected in 12 s is set in the second embodiment. The condition is set to not "at least 1 pulse" but "at least 5 pulses" for the following reason. In the radar detection of the second embodiment, a level at which a signal edge is detected and a level after a constant time since the edge detection are compared, the determination of the radar detection is made when the difference value is not lower than a threshold. Therefore, the false radar detection caused by receiving an unclear signal other than the radar pulse is prevented.

In this case, in the second embodiment, a mechanism that increments the count value by one when the radar is detected in a certain constant time (750 ms) is provided in order that the radar detection can be performed even if only 1 pulse exists in 1 burst (5 pulses in 12 s).

Therefore, it is possible to prevent the count value increment caused by the false detection in receiving the signal that is not the radar.

In the second embodiment, the number of detection times is incremented in the hardware section HW, and interrupt may be generated to the software at the time the counter value reaches a certain threshold. In the second embodiment, the detection may be performed based on polling. For example, the polling is performed at intervals of 750 ms, and the determination of the radar detection is made at the time the count value is incremented at least five times in 12 s. The parameters of FIG. 6 are expressed based on the polling.

In the second method, the determination of the radar detection is made when at least 3 pulses are detected in 1.5 s.

In the first method, the determination of the radar detection is made when at least 5 pulses are detected in 12 s. Therefore, the radar detection can accurately be performed.

However, for the polling-based radar detection method, the time of at least 3.750 s (=750 ms×5) is required until the radar pulse signal is detected. Therefore, in the second method, in order that the detection time is sped up when plural pulses (the maximum of 3 pulses) exist in 1 burst, the determination of the radar detection is made when at least 3 pulses are detected in the maximum time (1.5 s) of 1 burst. In the second method, the radar detection time can be shortened. For example, in the second method, the radar detection time can be shortened up to 1.5 s.

The above-described communication device is the wireless LAN communication device AP1 that is in conformity with IEEE 802.11. The wireless LAN communication device AP1 comprises the first circuit (counter) 391 that counts the number of receiving times of the signal that is neither the wireless LAN frame defined by IEEE 802.11a nor the OFDM signal, the second circuit 392 that retains the digital RSSI value when the first-time AGC is performed in the latest received frame, and the third circuit 393 that retains the RSSI value in latest received frame.

The radar detection processing section 21 of the second embodiment increments the count value of the radar detection counter 38, when the difference value between the current value of the first circuit 391 and the value of the first circuit 391 before the constant time T5 is not lower than the threshold V3 while the values of second circuit 392 and the third circuit 393 are lower than the thresholds V4 and V5, respectively.

The radar detection processing section 21 reads the count value of the radar detection counter 38 every constant time T6, and determines that the radar is detected when the difference value between the latest count value of the radar detection counter 38 and the count value of the radar detection counter 38 before the constant time T7 is not lower than the threshold V6.

Alternatively the radar detection processing section 21 of the second embodiment reads the number of receiving times of the signal that is neither the wireless LAN frame defined by IEEE 802.11a nor the OFDM signal in each constant time T6, and determines that the radar is detected when the difference value between the latest number of receiving times and the number of receiving times before the constant time T8 is not lower than the threshold V7.

In the communication device of the second embodiment having the features, the radar detection can be performed based on the data obtained by the existing hardware section HW, so that the installation of the circuit dedicated to the radar detection can be suppressed as much as possible. In the second embodiment, the processing amounts of the hardware section HW and the software can be prevented.

In the second embodiment, for example, the parameters such as the constant times T4 to T8 and the thresholds V3 to V7 can properly be set (optimized) in the theoretical, actual measurement, and empirical manners with the setting section 40.

In the first and second embodiments, plural parameters such as the constant times T1 to T8 and the thresholds V1 to V7 are set in order to deal with various pulse patterns, and the radar detection may be performed to plural kinds of the pulse patterns using the plural kinds of the parameters.

In the first and second embodiments, the parameters such as the constant times T1 to T8 and the thresholds V1 to V7 are changed with the setting section 40. Therefore, not only the radar detection but also other wireless signals such as UWB can be detected.

(Third Embodiment)

In a third embodiment, the detailed configuration and detailed operation of the communication device of the first and second embodiments will be described. In the third embodiment, the communication device of the second embodiment is described by way of example. However, the same holds true for the communication device of the first embodiment.

FIG. 8 is a block diagram illustrating an example of the communication device of the third embodiment.

The access point AP1 comprises the antenna section 6, the RF (Radio Frequency) section 14, an AGC (Automatic Gain Control) section 25, an ADC (Analog-to-Digital Converter) 26, a demodulation and decoding section 27, a pulse detecting section 28, an unidentified signal detecting section 29, an error detecting section 30, memory devices 31 to 35, and the radar detection processing section 21.

The RF section 14 deals with the wireless-frequency (high-frequency) signal. For example, in receiving the wireless-frequency signal, the RF section 14 performs processing for converting a wireless frequency into a baseband signal (low frequency) and processing for adjusting a gain of the baseband signal.

The AGC section 25 controls the gain of the RF section 14 such that amplitude of the output signal of the RF section 14 falls within a predetermined range.

The AGC section 25 stores data indicating a value D2 of the digital RSSI in the memory device 32. The value D2 of the digital RSSI is obtained when the first-time AGC is performed in the latest signal (finally received signal).

The AGC section 25 stores data indicating a value D3 of RSSI of the latest signal in the memory device 33.

The ADC 26 receives an analog signal from the RF section 14, converts the analog signal into a digital signal, and supplies the digital signal.

The demodulation and decoding section 27 performs predetermined signal processing to the digital signal, received from the ADC 26, to take out information (data).

The pulse detecting section 28 computes signal intensity from the digital signal, received from the ADC 26, to detect a pulsing signal. The pulse detecting section 28 stores the detected pulsing signal or the data of signal detection result in the memory device 33.

The unidentified signal detecting section 29 detects a signal that does not correspond with the reception in the digital signal received from the ADC 26 and a signal that cannot be demodulated and decoded in the digital signal received from the ADC 26. The unidentified signal detecting section 29 stores the number of receiving times D1 of the signal that does not correspond with the reception and signal that cannot be demodulated and decoded in the memory device 31.

For example, when the access point AP1 is the wireless LAN communication device, the unidentified signal detecting section 29 detects other signals that are not the wireless LAN communication signal, for example, the radar signal, a signal generated by a microwave oven, and a Blue Tooth signal.

The error detecting section 30 performs error detection to the information produced by the demodulation and decoding section 27, and supplies received data when the error is not detected. For example, the error detecting section 30 stores the received data in the memory device 35 such as a register or provides the received data to another section.

For example, the memory devices 31 to 34 are a PHY register.

The number of receiving times D1 of the signal that is neither the wireless LAN frame defined by IEEE 802.11a nor the OFDM signal is stored in the memory device 31.

In performing the first-time AGC in the latest received signal (received frame), the value D2 of the digital RSSI is stored in the memory device 32.

The value D3 of RSSI in the latest received signal (received frame) is stored in the memory device 33.

The data obtaining section 22 of the radar detection processing section 21 obtains the pieces of data D1 to D3 stored in the memory devices 31 to 33.

FIG. 9 is a block diagram illustrating an example of a configuration of the demodulation and decoding section 27 of the third embodiment.

The demodulation and decoding section 27 comprises a filter section 270, a synchronization section 271, an FFT window control section 272, an FFT 273, a pilot extraction section 274, an equalization section 275, a de-mapping section 276, a bit de-interleaving section 277, a Viterbi decoding section 278, and an energy reverse diffusion section 279.

Figure 10:
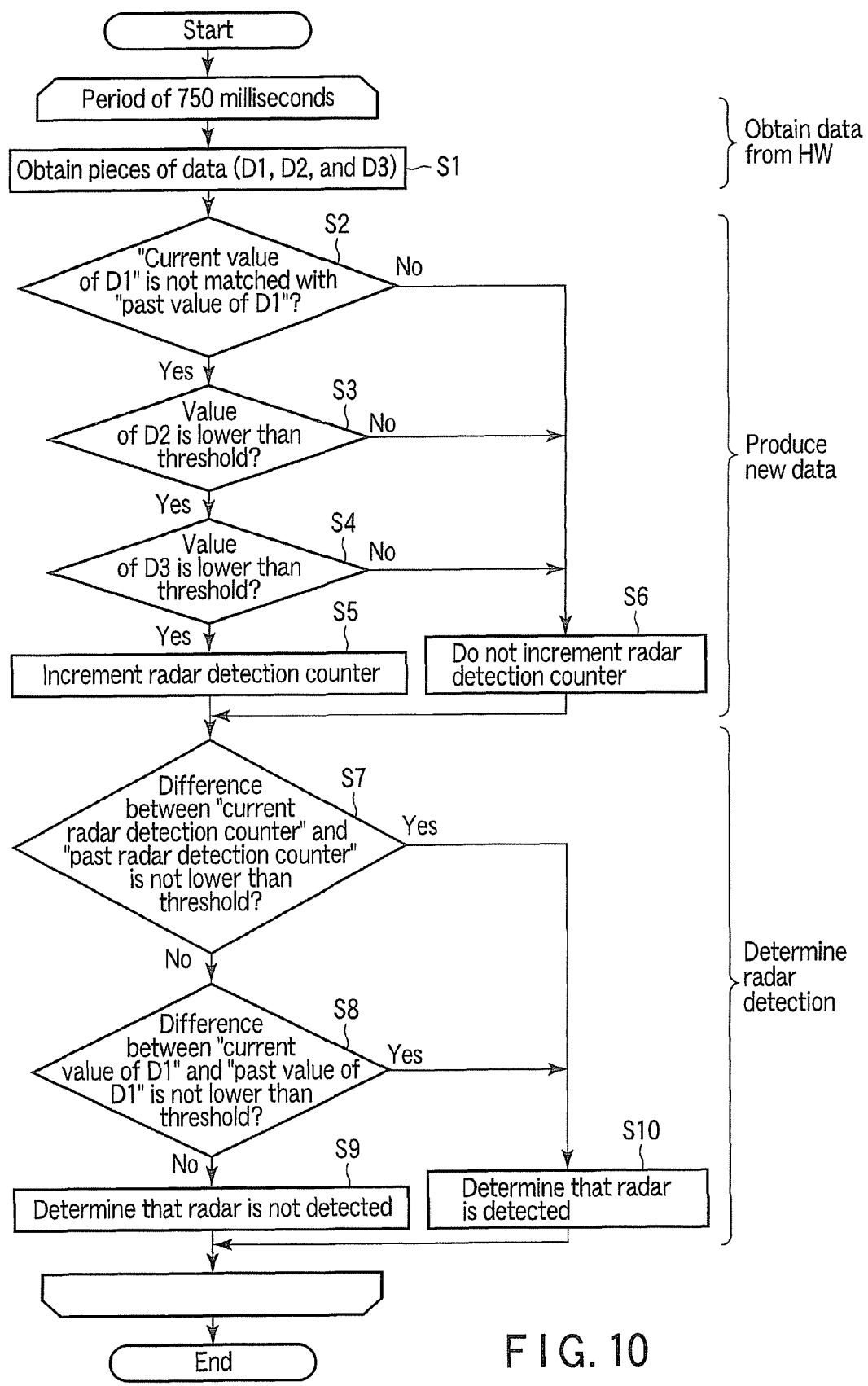
FIG. 10 is a flowchart illustrating an example of processing performed by a radar detection processing section according to the third embodiment.

FIG. 10 is a flowchart illustrating an example of processing performed by the radar detection processing section 21 of the third embodiment.

In FIG. 10, the radar detection processing section 21 performs the pieces of processing in Steps S1 to S10 in each of the passage of a certain time (for example, 750 ms).

In Step S1, the data obtaining section 22 obtains the number of receiving times D1 of the signal that is neither the wireless LAN frame defined by IEEE 802.11a nor the OFDM signal, the value D2 of the digital RSSI in performing the first-time AGC in the latest received signal, the value D3 of RSSI in the latest received signal from the hardware section HW.

In Step S2, the data producing section 23 determines whether the current value D1 is not matched with the past value D1 (before time T5), that is, whether a difference between the current value D1 and the past value D1 exceeds a predetermined threshold.

When the current value D1 is matched with the past value D1, the flow goes to the processing in Step S6.

When the current value D1 is not matched with the past value D1, in Step S3, the data producing section 23 determines whether the value D2 is lower than the predetermined threshold V4.

When the value D2 is not lower than the predetermined threshold V4, the flow goes to the processing in Step S6.

When the value D2 is lower than the predetermined threshold V4, in Step S4, the data producing section 23 determines whether the value D3 is lower than the predetermined threshold V5.

When the value D3 is not lower than the predetermined threshold V5, the flow goes to the processing in Step S6.

When the value D3 is lower than the predetermined threshold V5 (that is, the difference between the current value D1 and the past value D1 exceeds the predetermined threshold V3 while the values D2 and D3 are lower than the thresholds V4 and V5, respectively), in Step S5, the data producing section 23 increments the count value of the radar detection counter 38.

On the other hand, when the difference between the current value D1 and the past value D1 does not exceed the predetermined threshold V3, when the value D2 is not lower than the threshold V4 corresponding to the value D2, or when the value D3 is not lower than the threshold V5 corresponding to the value D3, as illustrated in the processing in Step S6, the data producing section 23 does not increment the count value of the radar detection counter 38.

In Step S7, the detection section 24 determines whether the difference value between the current value of the radar detection counter 38 and the past value of the radar detection counter 38 of the past (before time T7) is not lower than the threshold V6.

When the difference value between the current value of the radar detection counter 38 and the past value of the radar detection counter 38 is not lower than the threshold V6, the flow goes to the processing in Step S10.

When the difference value between the current value of the radar detection counter 38 and the past value of the radar detection counter 38 is lower than the threshold V6, in Step S8, the detection section 24 determines whether the difference between the current value D1 and the past value D1 (before time T8) is not lower than the predetermined threshold V7.

When the difference between the current value D1 and the past value D1 is lower than the predetermined threshold V7 (that is, when the difference between the current value of the radar detection counter 38 and the past value of the radar detection counter 38 is lower than the threshold V6 while the difference between the current value D1 and the past value D1 is lower than the predetermined threshold V7), in Step S9, the detection section 24 determines that the radar is not detected.

On the other hand, when the difference between the current value of the radar detection counter 38 and the past value of the radar detection counter 38 is not lower than the threshold V6, or when the difference between the current value D1 and the past value D1 is not lower than the predetermined threshold V7, in Step S10, the detection section 24 determines that the radar is detected.

In the pieces of processing, in Steps S2 to S4, the procedure can freely be changed or performed in parallel. In Steps S7 and S8, the procedure can freely be changed or performed in parallel.

In the third embodiment, the radar detection can accurately be performed based on the data retained in the existing hardware section HW included in the communication device that performs the wireless LAN communication, and the blocking of the wireless LAN communication caused by the false detection can be prevented. In the third embodiment, the increase in circuit scale can be prevented because of the conversion of the data obtained by the wireless LAN communication processing.

In the first to third embodiments, each component can freely be modified. For example, the memory devices 31 to 35 of FIG. 8 can freely be combined.

What is claimed is:

1. A radar detection device comprising:
   a count section which increments a count value of a counter when a difference value between a receiving power value in detecting an edge of a received signal of wireless communication and a receiving power value after a first time elapses since the edge detection is more than a first threshold; and
   a detection section which determines whether a difference value between the count value of the counter and a count value of the counter before a third time is not lower than a second threshold in each of passage of a second time, and determines that radar is detected when the difference value between the count value of the counter and the count value of the counter before the third time is not lower than the second threshold.

2. The radar detection device according to claim 1, further comprising a setting section which sets the first time and the first threshold to the count section and sets the second time, the third time, and the second threshold to the detection section.

3. The radar detection device according to claim 1, wherein the second time and the third time have an identical value.

4. The radar detection device according to claim 1, wherein the wireless communication is in conformity with at least one of IEEE 802.11 standards.

5. A communication device comprising the radar detection device according to claim 1, wherein the communication device stops the wireless communication when the radar detection device determines that the radar is detected.

6. A radar detection device comprising:
a count section which increments a count value of a radar detection counter, based on a first value, a second value, and a third value, when a difference value between the latest first value and the first value before a first time is not lower than a first threshold while the second value and the third value are lower than a second threshold corresponding to the second value and a third threshold corresponding to the third value, the first value indicating the number of receiving times of a received signal that is neither in conformity with a predetermined standard nor an OFDM signal, the second value indicating a value of a digital RSSI signal when first-time automatic gain control is performed in a recent received frame, the third value indicating a value of RSSI in the latest received frame; and
a detection section which determines whether a difference value between the latest value of the radar detection counter and a value of the radar detection counter before a third time is not lower than a fourth threshold in each of passage of a second time, and determines that radar is detected when the difference value is not lower than the fourth threshold.

7. The radar detection device according to claim 6, further comprising a setting section which sets the first time and the first to third thresholds to the count section and sets the second time, the third time, and the fourth threshold to the detection section.

8. The radar detection device according to claim 6, wherein a plurality of parameter sets each of which includes the first time, the first to third thresholds, the second time, the third time, and the fourth threshold are provided for the count section and the radar detection, and
the count section and the radar detection executes radar detections to a plurality of kinds of pulse patterns using said plurality of parameter sets.

9. The radar detection device according to claim 6, further comprising a measurement section which measures the first value, the second value, and the third value,
wherein the count section refers to the first value, the second value, and the third value of the measurement section at constant intervals,
the count section increments the count value of the radar detection counter when a first condition concerning the first value, a second condition concerning the second value, and a third condition concerning the third value are satisfied,
in the first condition, a difference value between the latest first value and the first value before the first time is not lower than the first threshold,
in the second condition, the second value is lower than the second threshold set with respect to the second value, and
in the third condition, the third value is lower than the third threshold set with respect to the third value.

10. The radar detection device according to claim 9, wherein the detection section determines that the radar is detected when a difference value between the latest first value and the first value before the second time is not lower than the fourth threshold.

11. The radar detection device according to claim 6, wherein the wireless communication is in conformity with at least one of IEEE 802.11 standards.

12. A communication device comprising the radar detection device according to claim 6, wherein the communication device stops the wireless communication when the radar detection device determines that the radar is detected.

13. A radar detection device comprising:
a count section which obtains the number of receiving times of a received signal that is neither in conformity with a predetermined standard nor an OFDM signal; and
a detection section which determines whether a difference value between the latest number of receiving times and the number of receiving times before a predetermined time is not lower than a predetermined threshold, and determines that radar is detected when the difference value is not lower than the threshold.

* * * * *